Feb. 17, 1931.  A. H. REED  1,793,447
PARACHUTE OPENER
Filed Jan. 5, 1929
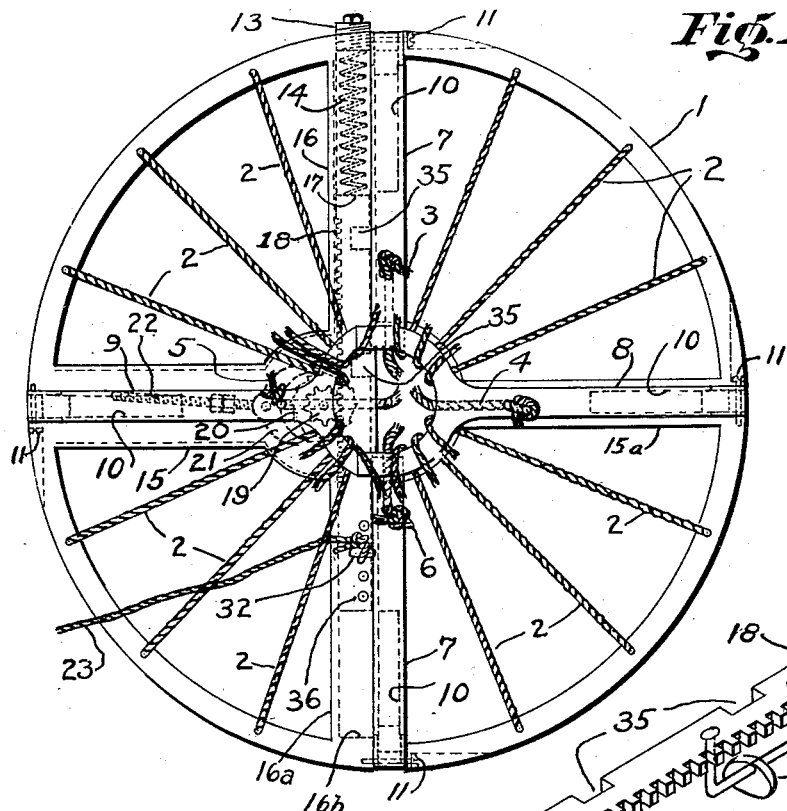
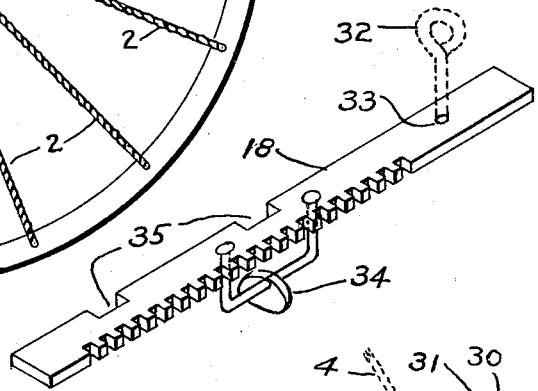
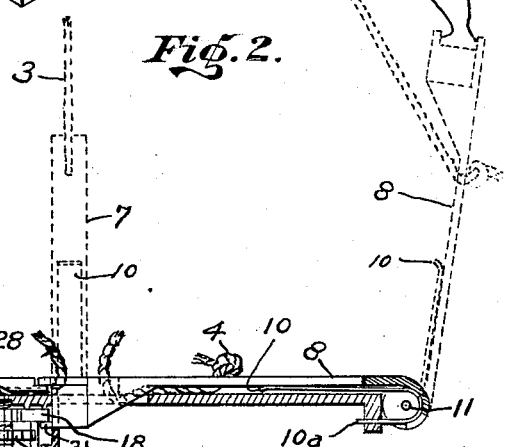
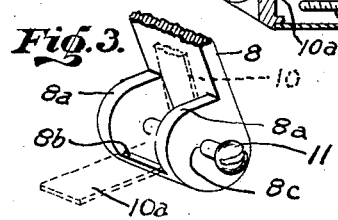
INVENTOR.
BY Andrew H. Reed
ATTORNEY.

Patented Feb. 17, 1931

1,793,447

UNITED STATES PATENT OFFICE

ANDREW H. REED, OF KANSAS CITY, MISSOURI, ASSIGNOR OF ONE-THIRD TO SAMUEL M. COFFMAN, ONE-THIRD TO CHARLES W. TURNER, AND ONE-SIXTH TO LILY O. COFFMAN, ALL OF KANSAS CITY, MISSOURI

PARACHUTE OPENER

Application filed January 5, 1929. Serial No. 330,471.

My invention relates to improvements in parachute openers in which a timing device is carried within hollow spokes of a band that serves as a place of attachment for the cords subtended from the edge of the umbrella of a parachute; and the objects of my invention are, first, to provide a means for spreading the edges of the parachute umbrella instantly but at a timed distance of drop from an air ship; and second, to provide such means that requires no winding by a key, or crank; and third, to provide such means that may be set ready to be operated by simply dropping the parachute from an air ship; and fourth, to provide a springing action at the time the umbrella takes the air to slow the falling speed of the parachute with its burden, and thus lessen the shock on the parachute when the air fills the umbrella.

I attain these objects by the mechanisms illustrated in the accompanying one sheet of drawings in which—

Fig. 1, is a plan view of my invention with all parts in locked, or set, position to be used for all purposes for which it is intended; and Fig. 2, is a side cross-sectional elevation of the same arrangement shown in Fig. 1, but with the open position of the arms shown in dotted lines; and Fig. 3, is a perspective view, in broken section, of the type of hinge employed for the opening arms and the opening springs in position therein; and Fig. 4, is a perspective view of the timer rack with the release pin shown in dotted lines above and the setting thumb piece carried under the rack.

Similar numerals refer to similar parts throughout the several views.

The umbrella of the parachute and the air ship are not shown in the drawings since my invention is adaptable to any type of umbrella and may be dropped from any object, such as an air ship or from a building, or from a ship's mast.

The band 1, Fig. 1, to which cords 2 are attached through holes by knotting the ends of the cords, carries spokes arranged at right angles to each other that are formed integral with the band. Spoke 15a is a mere fill-in for strength only and it is joined to spokes 16 and 16a by two curved portions near the center of band 1 to form a central circular opening. Spokes 16 and 16a placed opposite each other are hollow to carry a spring 14 and the timing rack 18, and they are placed at right angles to spoke 15a, while spoke 15 opposite to spoke 15a and at right angles to spokes 16 and 16a is hollow to permit the free action of the pendulum and escapement mechanism which is composed of gear 19, scapement wheel 20 and pendulum 22.

The pendulum 22 serves to step off the movement of rack 18 in interrupted steps the speed of which is controlled by the weight of the two nuts on 22 that are both employed to bind them together securely on the pendulum in any position along its length, which may be ascertained by test, to time the travel of rack 18, which is pressed by spring 14 and is in mesh with gear 19 that is turnable on shaft 26 that also carries the scapement wheel 20 turnably thereon, which receives power from spring 14 to operate pendulum 22 by means of hub ratchet 27 formed on the engaging hubs of gear 19 and scapement wheel 20.

The pendulum may be of any type now well known and in use in clocks.

To set my invention ready to be dropped from an air ship so it will open a parachute umbrella at a predetermined length of time after it is dropped, the cords 2, 3, 4, 5 and 6 are all brought together in a mass so that they all are enclosed in the circular opening between arms 8 and 9 near the middle of band 1, and rack 18 is in full unlocked position and spring 14 is expanded until the end of the rack is against the end 16b of the hollow space in spoke 16a and slots 35 of the timing rack register with slots in spokes 16 and 16a to permit lips 31 of arm 8 to pass down far enough so that a movement of rack 18 in compression spring 14 will slip the rack over lips 31 and hold arm 8 down and the lips 30 of arm 8 being over lips 29 of arm 9 and with both arms 7 being held down by arm 8 the cords will have all been brought to a central position within band 1, and the umbrella, not shown in the drawings, that the cords may be attached to will be brought close to the center of band 1 if attached at the ends of the cords shown broken, in Fig. 1, instead of to longer cords, and the umbrella would not open, in falling through the air till the cords are liberated. Rack 18 is pressed against spring 14 by means of thumb-button 34, Figs. 4 and 2, till hole 33 will register with one of holes 36 in the wall of spoke 16a, and pin 32 will then enter hole 33 of the rack and hold it, together with all arms and cords ready to be released when pin 32, which is attached by cord 23, Fig. 1, to the air ship and which will be pulled out of the holes 33 and 36 and remain with the air ship when the parachute is dropped, whereupon spring 14, at 17 will press rack 18 along and revolve gear 19 and, by means of ratchet 27, revolve scapement wheel 20 so that pendulum 22 may step off in interrupted steps the movement of rack 18 till slots 35 are in line with other slots in spokes 16 and 16a through which the lips 31 of arm 8 may pass and the two arms 7 and arms 8 and 9 which are pivoted on screws 11 will spring open by the action of springs 10, as shown by dotted lines in Fig. 2, and carry cords 3, 4, 5 and 6 with them and liberate cords 2, and thereby spread the umbrella so the air will readily catch under it and open it, which will produce a shock that will be minimized by springs 10 and lessen the danger of snapping the cords by the shock when the parachute carries a heavy burden.

The timing is readily provided for by holes 36 being placed in line so a pin 32 may enter hole 33 of rack 18 and hold it in locked position with a more or less pressure against spring 14. Holes 36 may be drilled and tested on the work bench for the timing of rack 18 so that the invention may be set to drop a burden carried by a parachute so that the parachute will open at any desired distance above the ground when dropped from a given altitude to facilitate accuracy in hitting a landing field instead of a body of water or the like.

The winding up process, or, rather, pushing rack 18 against spring 14, is made possible, and very simple, by a ratchet 27, Fig. 2, on the engaging hubs of gear 19 and scapement wheel 20 and coil spring 28 which permits the gear to rise out of the ratchet and turn when rack 18 is moved toward spring 14 without operating pendulum 22 or the gear getting out of mesh with the rack, or requiring the pendulum to step a backward movement of scapement wheel 20.

The hollow spaces in spokes 15, 16 and 16a, are closed by a cover plate 24 which is held in place by pivot screw 25 of the pendulum and shaft screw 26 of the gear and escapement wheel. The cover plate 24 is slotted to accommodate the free movement of thumb piece 34 of rack 18 which carries it riveted thereto by two stems to stiffen it to withstand pressure against a heavy spring 14 which may be readily replaced by removing plug 13, with a heavier or lighter spring. It may be seen that the flat springs 10 may be replaced by heavier or lighter springs, if found to be necessary, by removing pivot screws 11 and inserting fixed ends 10a of the springs into slots provided for them in the underside of the spokes; the springs being held in proper place between lugs 8a and fin 8b within the arms in both open and closed position.

Having thus fully described my invention, I claim—

1. In a parachute opener, a spring operated cord bunching arm that is pivotally carried by a circular band that pivotally carries other spring operated arms, cords attached to each said arms, said cords being carried on the outer edge of the umbrella of a parachute; all of said arms being held in position to be locked by lips on said cord bunching arms; all of said cords serving to open a parachute umbrella when said arms are forced by said springs into open position.

2. In a parachute opener, spring operated, pivotally mounted arms carried by a circular band, said arms being held in locked position by a lip on the cord bunching arm, said lip being on the arm which is engaged by a spring actuated, pendulum controlled, timing rack, the teeth of which mesh with the teeth of a gear that has a ratchet hub in engagement with another ratchet hub carried on the same shaft on the hub of an escapement wheel which is intermittently engaged by said pendulum to permit the movement of said timing rack by interrupted steps, substantially as shown and described.

3. In a parachute opener, a timing rack carried in hollow spokes within a circular band; external means for moving said rack laterally to compress a spring for its reverse movement; slots in said rack to receive lips on a bunching arm when in released position, means for lateral movement of said rack to engage said lips on said bunching arm, and escapement means for stepping said rack laterally back to release position to release said bunching arm.

4. In a parachute opener, a circular band, hollow spokes carried thereon, timing means carried in said spokes to hold opening arms that bunch the cords of a parachute into a central mass within the said circular band to close the umbrella of the parachute, and means for setting the timing mechanism in motion by dropping the closed parachute free from an air ship, and means for liberating the bunched cords and forcing the parachute umbrella to open.

ANDREW H. REED.